Aug. 14, 1923.
H. A. W. WARD
1,464,789
HOLDER FOR BOTTLES
Filed Aug. 2, 1922
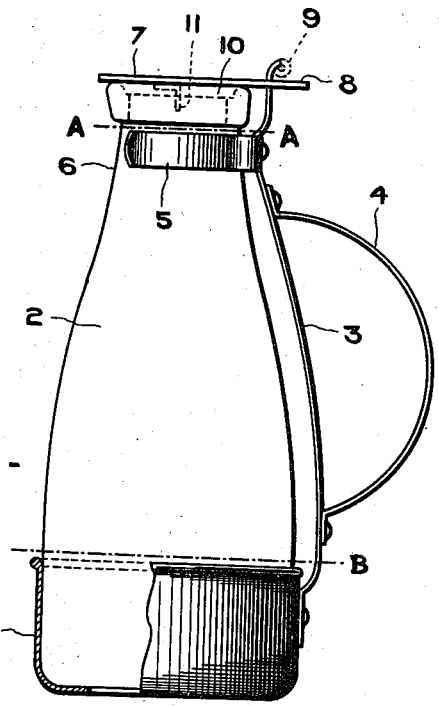
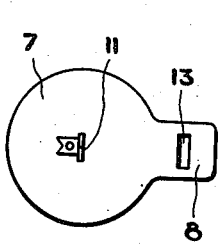
FIG. 4.
FIG. 1.
FIG. 5.
FIG. 3.
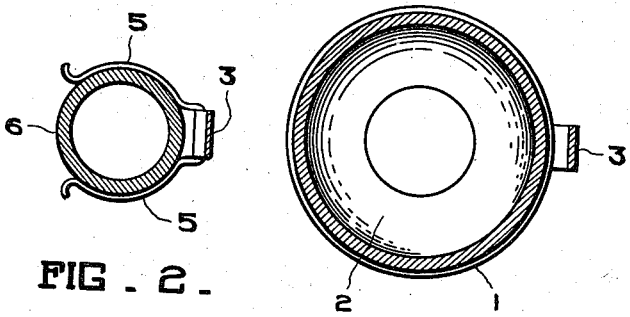
FIG. 2.
Inventor
H.A.W. Ward
By Marks & Clerk
Atty's Patented Aug. 14, 1923.

1,464,789

UNITED STATES PATENT OFFICE.

HENRY ALBERT WILLIAM WARD, OF LOWER HUTT, WELLINGTON, NEW ZEALAND.

HOLDER FOR BOTTLES.

Application filed August 2, 1922. Serial No. 579,248.

*To all whom it may concern:*

Be it known that I, HENRY ALBERT WILLIAM WARD, a citizen of the Dominion of New Zealand, and a subject of the King of Great Britain, resident of 16 Pretoria Street, Lower Hutt, in the Provincial District of Wellington, New Zealand, have invented certain new and useful Improvements in Holders for Bottles, of which the following is a specification.

This invention relates to holders suitable for handling bottles, and more particularly the invention is adapted for use upon bottles wherein milk is held during transit.

The object of the invention is to provide a holder whereby a bottle may be readily handled by a consumer, which is readily adjusted on a bottle, and comprises a handle whereby the contents of the bottle are readily poured out instead of just pouring the milk from the bottle into a jug, the intention being that the milk shall be poured direct from the bottle into drinking and cooking utensils.

A further object is to eliminate contamination as much as possible, especially in the case of bottles used for transporting milk.

The invention is illustrated in the accompanying drawing wherein:—

Figure 1 is a side elevation of the holder with the bottle in position,

Figure 2 is a sectional plan on line A—A, Figure 1.

Figure 3 is a sectional plan on line B—B, Figure 1.

Figure 4 is the reverse plan of a lid, and

Figure 5 is a side elevation of the lid.

The holder comprises a base 1 made in the form of a shallow socket, wherein the bottom of the bottle 2 fits, and a vertical bar 3 connected to the base 1 is shaped to form a handle, or a handle 4 is fixed to the said bar 3. The upper end of the bar 2 is provided with a spring clip 5, which readily springs upon and grips the neck 6 of the bottle.

The bar 3 is formed with a slight extension which rises slightly higher than the rim of the bottle, asd carries a lid 7 adjustable in height on the bar to suit small differences in height in any particular class of bottles, with the object that whatever the height of the bottle the lid shall seat itself flat upon the rim. This object is conveniently effected by providing the lid with a finger piece 8 having a slot 13 through which the bar passes freely, leaving the tail projecting rearwardly of the bar, so that the finger piece may be operated by one of the fingers or the thumb of the hand grasping the handle.

The top of the bar 3 may be formed into, or provided with a stop 9 (shown by dotted lines in Figure 1) to prevent the removal of the lid from the bar.

The neck of a milk bottle is closed by a cardboard stopper or disc 10 to prevent contamination, and this disc is somewhat difficult to extract. In the case of milk, upon the underside of the lid a headed prong in the form of a short spear 11 with barbs 12 projects downwardly for the purpose of readily removing the disc.

To extract the disc, the lid 7 is closed until the spear 11 is forced through the disc in the neck of the bottle. The bottle is then given a part turn to bring the barbs 12 below the uncut portions of the disc, which is then readily extracted by raising the lid.

The stops 9 may be dispensed with, so that the lid may be readily removed from the bar. The spear is then forced through the disc as before described, the lid given a part turn and the disc extracted by raising the lid.

What I do claim and desire to obtain by Letters Patent of the United States of America is:—

The combination with the neck of a bottle having an annular interior shoulder, and a stopper seated on the shoulder, of a handle removably engaged with the bottle, an extension on the handle and rising above the bottle and being curved outwardly, a lid for disposition on the bottle, a slotted finger piece projecting outwardly from the bottle and mounted for movable engagement with the curved extension, and a headed prong depending from the lid and engageable with the stopper.

In testimony whereof I have signed my name to this specification in the presence of two witnesses.

HENRY ALBERT WILLIAM WARD.

Witnesses:
 GEO. H. RICHARDSON,
 MARSHALL INGELLS MAYS.